US009717042B2

(12) United States Patent
Forssell et al.

(10) Patent No.: US 9,717,042 B2
(45) Date of Patent: Jul. 25, 2017

(54) NETWORK DISCOVERY AND SELECTION

(75) Inventors: Mika Forssell, Soderkulla (FI);
Veli-Matti Tettinen, Veikkola (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 217 days.

(21) Appl. No.: 12/993,862

(22) PCT Filed: Jun. 4, 2008

(86) PCT No.: PCT/EP2008/056914
§ 371 (c)(1),
(2), (4) Date: Nov. 22, 2010

(87) PCT Pub. No.: WO2009/146741
PCT Pub. Date: Dec. 10, 2009

(65) Prior Publication Data
US 2011/0072101 A1 Mar. 24, 2011

(51) Int. Cl.
*G06F 15/16* (2006.01)
*H04W 48/18* (2009.01)
*H04W 48/04* (2009.01)
*H04W 40/24* (2009.01)

(52) U.S. Cl.
CPC .......... *H04W 48/18* (2013.01); *H04W 48/04* (2013.01); *H04W 40/246* (2013.01)

(58) Field of Classification Search
CPC .... H04W 40/246; H04W 48/18; H04W 48/04
USPC ................ 709/206, 221, 226; 370/331, 338; 455/436
See application file for complete search history.

(56) References Cited

U.S. PATENT DOCUMENTS

| 7,505,433 | B2 * | 3/2009 | Yaqub et al. ................. 370/331 |
| 7,710,964 | B2 * | 5/2010 | Patil et al. .................... 370/392 |
| 8,077,681 | B2 * | 12/2011 | Ahmavaara et al. ......... 370/338 |
| 8,102,814 | B2 * | 1/2012 | Rahman et al. .............. 370/331 |
| 8,121,594 | B2 * | 2/2012 | Jiang .......................... 455/432.1 |
| 8,194,589 | B2 * | 6/2012 | Wynn et al. .................. 370/328 |
| 8,385,916 | B2 * | 2/2013 | Raleigh ...................... 455/432.1 |

(Continued)

FOREIGN PATENT DOCUMENTS

| EP | 1701472 | 9/2006 |
| WO | 01/35585 | 5/2001 |

(Continued)

OTHER PUBLICATIONS

IEEE Std 802.21-2008, for Local and metropolitan area networks—Part 21: Media Independent Handover Services, Jan. 21, 2009, IEEE Computer Society, LAN MAN Standards Committee, a total of 301 pages.*

(Continued)

*Primary Examiner* — Brian J Gillis
*Assistant Examiner* — Amy Ling
(74) *Attorney, Agent, or Firm* — Squire Patton Boggs (US) LLP

(57) ABSTRACT

Network discovery comprises discovering networks being available for a device and automatically providing communication settings for at least one of discovered networks to the device. The network discovery may be device initiated or network-initiated. The communication settings provision may be effected by network discovery functionality or another functionality such as device management functionality.

16 Claims, 11 Drawing Sheets

(56) References Cited

U.S. PATENT DOCUMENTS

| | | |
|---|---|---|
| 2006/0140150 A1* | 6/2006 | Olvera-Hernandez et al. .............................. 370/331 |
| 2006/0187858 A1* | 8/2006 | Kenichi et al. ............... 370/254 |
| 2006/0217147 A1 | 9/2006 | Olvera-Hernandez et al. |
| 2007/0177554 A1 | 8/2007 | Yang |
| 2007/0190974 A1* | 8/2007 | Zhang .................... H04L 63/08 455/411 |
| 2010/0118771 A1* | 5/2010 | Lee et al. ....................... 370/328 |
| 2011/0110300 A1* | 5/2011 | Sachs .................. H04W 48/18 370/328 |
| 2012/0238287 A1* | 9/2012 | Scherzer ............... H04W 48/16 455/456.1 |

FOREIGN PATENT DOCUMENTS

| | | |
|---|---|---|
| WO | 2004/077752 | 9/2004 |
| WO | 2007/026908 | 3/2007 |

OTHER PUBLICATIONS

Intel-Samsung, "C1-082075, Interactions with ANDSF", May 5-9, 2008, 3GPP TSG CT WG1 Meeting #53, 2 pages.*
Intel, "C1-081396, ANDSF UE Procedures", Apr. 7-11, 2008, 3GPP TSG CT WG1 Meeting #52, 3 pages.*
IEEE P802.21/D11.0, Draft Standard for Local and metropolitan Area Networks: Media Independent Handover Services, LAN MAN Standards Committee, IEEE Computer Society, May 2008, a total of 316 pages.

* cited by examiner

NETWORK DISCOVERY AND SELECTION

FIELD OF THE INVENTION

The present invention generally relates to network discovery and selection. In particular, embodiments of the present invention relate to network discovery and selection in an environment of heterogeneous networks, as well as to an access of a discovered and selected network.

BACKGROUND OF THE INVENTION

Recently, there is a trend in the field of communication that more networks, more network technologies and more service providers emerge. This trend leads to increasingly heterogeneous network environments. In such heterogeneous network environments, there is among others a need for convergence, interworking and handover measures. In this regard, measures are required, which enable a device such as a terminal or user equipment to discover, select and access at least one network which is preferred and/or trusted and/or suitable for accessing, e.g. when a certain service is desired. A network to be discovered and selected may e.g. be an access network operating with a network technology such as for example GSM (Global System for Mobile Communication), GPRS (General Packet Radio Service), WCDMA (Wideband Code Division Multiple Access), HSPA (High Speed Packet Access), LTE (Long-term Evolution), WiMAX (Worldwide Interoperability for Microwave Access), WLAN (Wireless Local Area Network), and femtocells.

For example, the Institute of Electrical and Electronics Engineers (IEEE) has specified a standard called IEEE 802.21 for providing media-independent handover (MIH) to address such needs. Also, the Third Generation Partnership Project (3GPP) has specified an access network discovery and selection function (ANDSF) to address such needs. These approaches address the above needs by providing preferences and policies to devices, which assist the devices and their users to select preferred and trusted networks for accessing certain services. Both IEEE 802.21 and 3GPP ANDSF allow devices to request information about neighboring networks, i.e. coexisting/surrounding (access) networks within reach, to know which one or more of the networks are preferred, trusted and/or suitable for different services. This information may include e.g. network operator name, operator (roaming) partners, used frequencies, cost information etc. Further, the following information may be provided about (access) networks: a prioritized network list for using the networks, network name and/or type, service provider, cost of using the networks, and other policy parameters related to network selection and discovery, for example "Don't use Technology A, like WLAN, if other alternatives are available". This makes efficient use of coexisting/surrounding networks as networks are discovered and used. Hence, both approaches are for bringing neighboring networks to device/subscriber's attention, and may in general terms be referred to as "network discovery".

There is a drawback in the above-mentioned approaches in that only policies, preferences and general network information for discovery and selection of neighboring (access) networks are provided. This means that based on thus provided information a device may be able to differentiate as to which of the networks should be prioritized over the other networks, when selecting a target access network to be used for connectivity. However, usually no information on how to access such discovered (access and/or service) networks is available at the device. Depending on the underlying network environment, such information may for example comprise WLAN security settings, e.g. WEP/WPA keys, and a HTTP (Hyper-Text Transfer Protocol) password or WLAN and VoIP (Voice over Internet Protocol) settings.

On the one hand, this prevents that device from being able to instantly access a discovered (and selected) network. Rather, additional retarding and/or tedious and/or difficult procedures are necessary therefore. For example, as is used today, a cellular operator or service provider may furnish required information via a short message service (SMS) for access data services via that specific cellular network. Besides delaying a possible network access, such an approach is impedimental and thus improper for a dynamic network environment, such as e.g. in the context of non-cellular devices, like WiMAX/WLAN devices. Also, when using a home network, adding and removing of local area networks (WLAN, femtocell) and communication partners may make the network environment dynamic, thus disabling an approach as mentioned hereinbefore. Alternatively, an end user, i.e. a user of a device, may be required to manually perform required configurations, which may be very challenging and cumbersome for the end user, and is error-prone.

When roaming, which is a widespread and important scenario for mobile device, there are lots of unfamiliar networks to the device and its subscriber, potentially also networks that would still be preferred and/or trusted. Yet, in the absence of dedicated information, such unfamiliar networks may not be accessed, even if discovered.

On the other hand, a lack of such information on how to access such discovered (access and/or service) networks may also lead to the non-discovery of certain ("hidden") networks. That is, certain networks may be hidden in the sense that they are neighboring networks, but are not visible for a device, if proper configurations and/or communication information is not available. For example, WLAN SSid (service set identifier) may be hidden, thus preventing a use of the WLAN network if SSid is not known beforehand.

In short, present network discovery (and selection) approaches are not sufficient for today's and future needs in heterogeneous network environments, in particular as regards instant network access to discovered (and selected) or hidden networks.

Accordingly, there does not exist any feasible solution to the above drawbacks.

SUMMARY OF EMBODIMENTS OF THE INVENTION

The present invention and its embodiments are made to address one or more of the above-described drawbacks. Thus, the present invention and its embodiments are intended to mitigate drawbacks in network discovery and selection.

According to one exemplary aspect of the present invention, there is provided a method comprising discovering networks being available for a device, and providing communication settings for at least one of discovered networks to the device.

According to further developments or modifications thereof, one or more of the following applies:

the network discovery is initiated by the device,
the method further comprises receiving a request for communication settings for at least one of discovered networks from the device, and causing communication settings provision for the requested communication settings, the communication settings provision is effected by network discovery functionality, and comprises including the requested communication settings in a network discovery message, and transmitting the network discovery message including the requested communication settings to the device, the communication settings provision is effected by device management functionality, and comprises triggering device management operation, and supplying a configuration of the requested communication settings on the basis of the triggered device management operation to the device, the network discovery is initiated at a network, the method further comprises advertising neighboring networks to the device, and causing communication settings provision for the requested communication settings, the communication settings provision is effected by neighbor network advertisement functionality, and comprises including the requested communication settings in a neighbor network advertisement message, and transmitting the neighbor network advertisement message including the requested communication settings to the device, the communication settings provision is effected by device management functionality, and comprises triggering device management operation, and supplying a configuration of the requested communication settings on the basis of the triggered device management operation to the device, the method further comprises selecting a network on the basis of the discovered networks, and accessing the selected network on the basis of the provided communication settings, the network discovery comprises providing preferences and policies for selecting a network being at least one of preferred, trusted and suitable for a desired service, the communication settings provision comprises providing communication settings which have changed as compared with communication settings currently being in effect at the device, the communication settings comprise at least one of network and service settings of at least one discovered network, the communication settings comprise at least one of account information, security settings, authentication credentials, communication credentials, and network access information, and/or the network discovery is effected in accordance with at least one of IEEE 802.21 and an access network discovery and selection function.

According to one exemplary aspect of the present invention, there is provided a method comprising discovering networks being available for access, and obtaining communication settings for at least one of discovered networks from a network.

According to further developments or modifications thereof, one or more of the following applies:

the method further comprises initiating network discovery towards the network, the method further comprises sending a request for communication settings for at least one of discovered networks to the network, receiving the requested communication settings, and configuring in accordance with the received communication settings for accessing at least one of the discovered networks, the method further comprises sending a request for communication settings for at least one of discovered networks to the network, receiving a configuration of the requested communication settings, and configuring in accordance with the received configuration for accessing at least one of the discovered networks, the method further comprises receiving a neighbor network advertisement from the network, receiving the requested communication settings, and configuring in accordance with the received communication settings for accessing at least one of the discovered networks, the method further comprises receiving a neighbor network advertisement from the network, receiving a configuration of the requested communication settings, and configuring in accordance with the received configuration for accessing at least one of the discovered networks, the method further comprises performing device management operation with the network, the method further comprises selecting a network on the basis of the discovered networks, and accessing the selected network on the basis of the provided communication settings, the network discovery comprises obtaining preferences and policies for selecting a network being at least one of preferred, trusted and suitable for a desired service, the communication settings comprise at least one of network and service settings of at least one discovered network, the communication settings comprise at least one of account information, security settings, authentication credentials, communication credentials, and network access information, and/or the network discovery is effected in accordance with at least one of IEEE 802.21 and an access network discovery and selection function.

According to one exemplary aspect of the present invention, there is provided an apparatus comprising a network discovery functional entity configured to discover networks being available for a device, and a communication settings provision functional entity configured to provide communication settings for at least one of discovered networks to the device.

According to further developments or modifications thereof, one or more of the following applies:

the apparatus further comprises a receiver configured to receive a request for communication settings for at least one of discovered networks from the device, and a settings provision causing processor configured to cause communication settings provision for the requested communication settings, the communication settings provision functional entity is configured as a part of the network discovery functional entity and comprises a settings database configured to hold communication settings, a network discovery message generator configured to include the requested communication settings from the settings database in a network discovery message, and a transmitter configured to transmit the network discovery message including the requested communication settings to the device, the communication settings provision functional entity is configured as a part of a device management functionality and comprises a device management processor configured to perform device management operation, and a device settings configurator configured to supply a configuration of the requested communication settings on the basis of the triggered device management operation to the device, and wherein the settings provision causing processor is configured to trigger the device management processor, the network discovery functional entity is configured to initiate network discovery, the apparatus further comprises a network advertisement processor configured to advertise neighboring networks to the device, and a settings provision causing processor configured to cause communication settings provision for the requested communication settings, the communication settings provision functional entity is configured as a part of the network discovery functional entity and comprises a settings database configured to hold communication settings, a network advertisement message generator configured to include the requested communication settings from the settings database in a network advertisement message, and a transmitter configured to transmit the network advertisement message including the requested communication settings to the device, the communication settings provision functional entity is configured as a part of a device management functionality and comprises a device management processor configured to perform device management operation, and a device settings configurator configured to supply a configuration of the requested communication settings on the basis of the triggered device management operation to the device, and wherein the settings provision causing processor is configured to trigger the device management processor, the apparatus further comprises a network select/access processor configured to select a network on the basis of the discovered networks and/or to access the selected network on the basis of the provided communication settings, the network discovery functional entity is configured to provide preferences and policies for selecting a network being at least one of preferred, trusted and suitable for a desired service, the communication settings provision functional entity is configured to provide communication settings which have changed as compared with communication settings currently being in effect at the device, the communication settings comprise at least one of network and service settings of at least one discovered network, the communication settings comprise at least one of account information, security settings, authentication credentials, communication credentials, and network access information, and/or the apparatus comprises at least one of an access network discovery and selection function and a device management server.

According to one exemplary aspect of the present invention, there is provided an apparatus comprising a network discovery processor configured to discover networks being available for access, and a settings configurator configured to obtain communication settings for at least one of discovered networks from a network.

According to further developments or modifications thereof, one or more of the following applies:

the network discovery processor is further configured to initiate network discovery towards the network, the apparatus further comprises a transmitter configured to send a request for communication settings for at least one of discovered networks to the network, and wherein the settings configurator is further configured to receive the requested communication settings and to configure the apparatus in accordance with the received communication settings for accessing at least one of the discovered networks, the apparatus further comprises a transmitter configured to send a request for communication settings for at least one of discovered networks to the network, and a device manager configured to receive a configuration of the requested communication settings, and wherein the settings configurator is further configured to configure the apparatus in accordance with the received configuration for accessing at least one of the discovered networks, the apparatus further comprises a receiver configured to receive a neighbor network advertisement from the network, and wherein the settings configurator is further configured to receive the requested communication settings and to configure the apparatus in accordance with the received communication settings for accessing at least one of the discovered networks, the apparatus further comprises a receiver configured to receive a neighbor network advertisement from the network, and a device manager configured to receive a configuration of the requested communication settings, and wherein the settings configurator is further configured to configure the apparatus in accordance with the received configuration for accessing at least one of the discovered networks, the apparatus further comprises a device manager configured to perform device management operation with the network, the apparatus further comprises a network select/access processor configured to select a network on the basis of the discovered networks and/or to access the selected network on the basis of the provided communication settings, the network discovery processor is further configured to obtain preferences and policies for selecting a network being at least one of preferred, trusted and suitable for a desired service, the communication settings comprise at least one of network and service settings of at least one discovered network, the communication settings comprise at least one of account information, security settings, authentication credentials, communication credentials, and network access information, and/or the apparatus is at least one of a device, a terminal and a user equipment.

According to one exemplary aspect of the present invention, there is provided a computer program product comprising program code means being arranged, when run on a processor of an apparatus, to perform the first-mentioned method of above with or without any one of its further developments or modifications.

According to one exemplary aspect of the present invention, there is provided a computer program product comprising program code means being arranged, when run on a processor of an apparatus, to perform the second-mentioned method of above with or without any one of its further developments or modifications.

By way of exemplary embodiments of the present invention, there is provided an automated network and service settings provision, which may favorably be applied for heterogeneous networks, i.e. in a network environment consisting of a plurality of networks of at least partly different network technologies. This may also be favorably applied for a dynamic network environment where networks become usable/unusable dynamically, for example when new networks are added and/or removed.

By way of exemplary embodiments of the present invention, there is suggested an automated settings provision as part of network discovery functionality and/or device management functionality, thus mitigating end user configuration complexity and improving ease of use (namely, avoiding any user intervention), as well as allowing instant access to preferred and/or trusted and/or suitable networks (even if the device has not used that network before). Also, as networks become usable for a device after automatic settings provision, traffic distribution across different networks may become more advanced, thus reducing congestion probability in one network and/or improving quality of experience (quality of service) for all users in all involved networks.

By way of exemplary embodiments of the present invention, different settings, such as e.g. communication settings, are provided for devices and their subscribers in addition to network discovery information.

Further aspects, embodiments and modifications according to the present invention and its embodiments are set out in the following detailed description and/or in respective claims appended hereto.

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS OF THE PRESENT INVENTION

The present invention is described herein with reference to particular non-limiting examples. A person skilled in the art will appreciate that the invention is not limited to these examples, and may be more broadly applied.

In particular, the present invention and its embodiments is mainly described in relation to IEEE and 3GPP specifications being used as non-limiting examples for network configurations. As such, the description of the embodiments given herein specifically refers to terminology which is directly related thereto. Such terminology is only used in the context of the presented non-limiting examples, and does naturally not limit the invention in any way. Rather, any other network configuration or implementation may also be utilized as long as compliant with the features described herein.

In the following, various embodiments and implementations of the present invention and its aspects are described using several alternatives. It is generally to be noted that, according to certain needs and constraints, all of the described alternatives may be provided alone or in any conceivable combination (also including combinations of individual features of the various alternatives).

Figure 1:
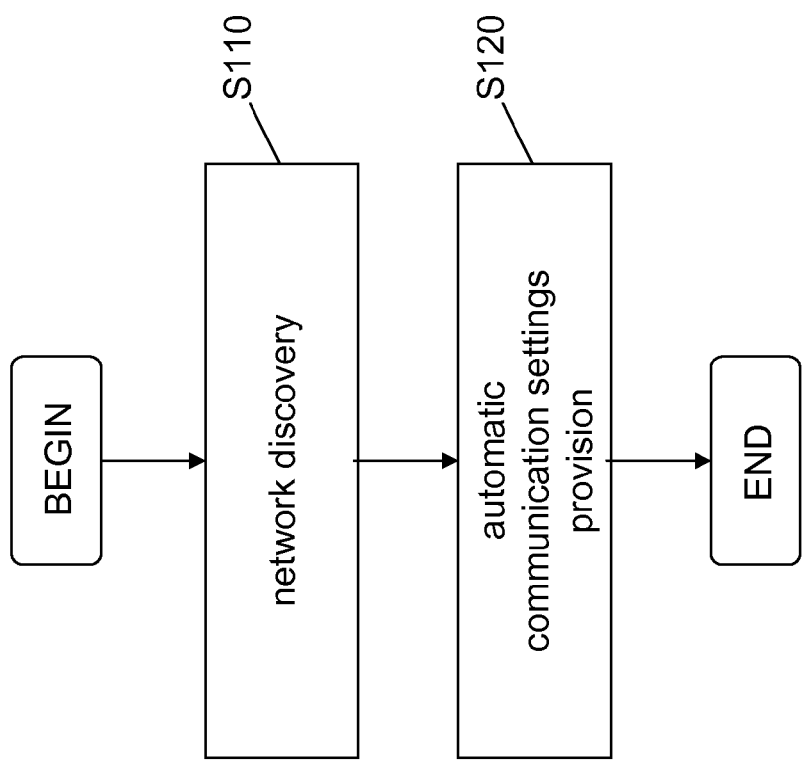
FIG. 1 shows a flow diagram of a method according to an exemplary embodiment of the present invention.

FIG. 1 shows a flow diagram of a method according to an exemplary embodiment of the present invention.

In most generic terms, a method according to an embodiment of the present invention comprises a process of network discovery (and selection), as denoted by S110 in FIG. 1. Such network discovery (and selection) may be effected in accordance with current specifications, such as IEEE 802.21 or 3GPP ANDSF as mentioned above. Further, the method comprises a process of automatic communication settings provision, as denoted by S120 in FIG. 1. The communication settings are provided from a network side (by providing such settings) to a device side (by obtaining such settings). In the sense of the present embodiment (and other embodiments of the present invention), communication settings may refer to network and service settings of at least one discovered network, such as for example account information (e.g. a HTTP password), security settings (e.g. WPA (Wi-Fi Protected Access) or WEP (Wired Equivalent Privacy) keys for WLAN), authentication credentials, communication credentials (e.g. VoIP settings), and network access information.

However, it is to be noted that the illustrated sequence is only exemplarily. For details, reference is made to the description of FIG. 2 below.

Figure 2:
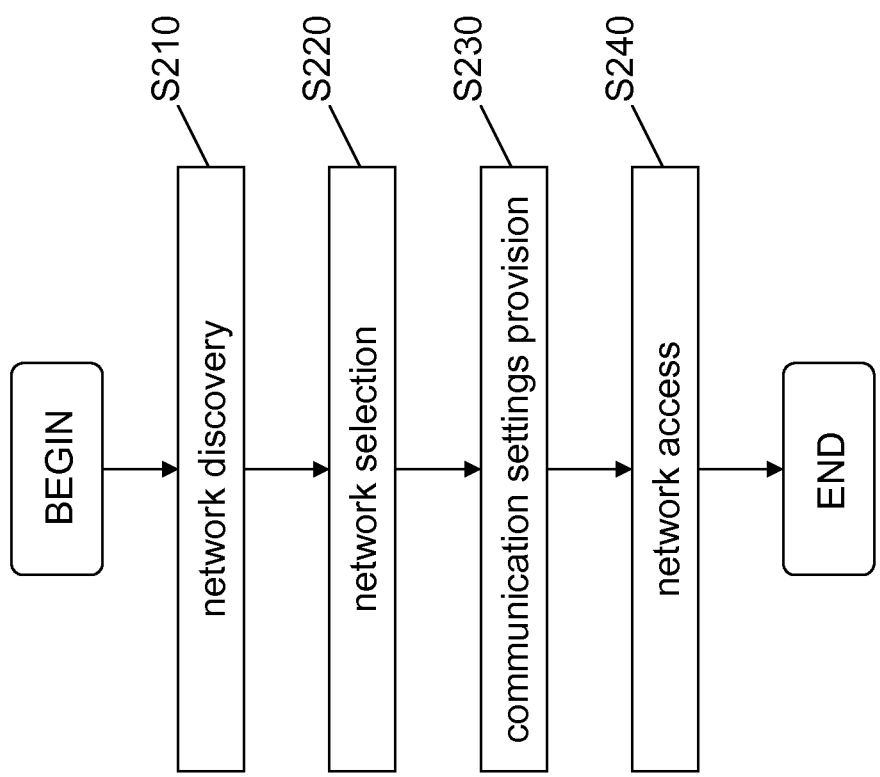
FIG. 2 shows a flow diagram of another method according to an exemplary embodiment of the present invention.

FIG. 2 shows a flow diagram of another method according to an exemplary embodiment of the present invention.

According to the embodiment of FIG. 2, a relation between network discovery and communication settings provision, as e.g. according to the above-described embodiment, and network selection and network access is exemplarily illustrated.

As illustrated in FIG. 2, a process of network discovery (S210) may be followed by a process of network selection (S220), both e.g. according to IEEE 802.21 or 3GPP ANDSF. After network discovery and selection, communication settings provision (S230) may be effected, and thereafter at least one of thus discovered, selected networks may be accessed by way of the thus provided settings (S240). However, it is to be noted that the illustrated sequence is only exemplarily. It may also be feasible that the process of communication settings provision is the first process being followed by network discovery, network selection and network access. This may be a viable approach in the case of hidden networks as mentioned beforehand. Alternatively, network selection may be performed only after communication settings provision. In general, settings provision according to various embodiments of the present invention (independent of the implementation thereof, as described below) may be effected before or after or during network discovery procedures (including both device-initiated and network-initiated network discovery procedures). Moreover, these processes may be performed in chain, in parallel or separately, respectively.

Figure 3:
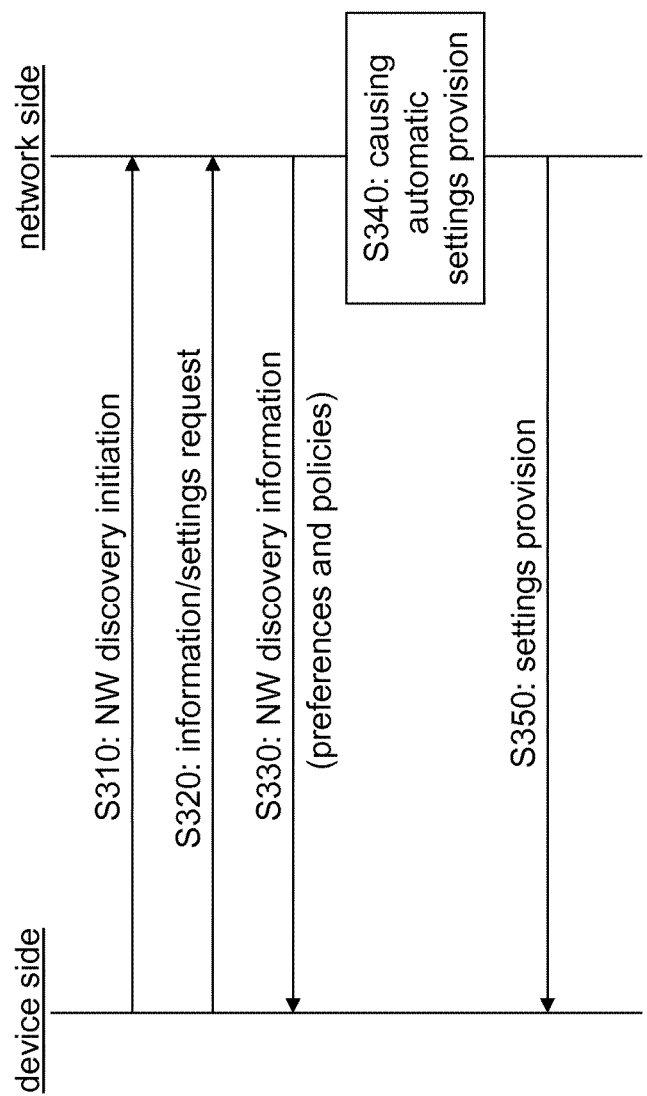
FIG. 3 shows a signaling diagram of a method according to an exemplary embodiment of the present invention.

FIG. 3 shows a signaling diagram of a method according to an exemplary embodiment of the present invention. The depicted signaling is between a device side, e.g. representing a terminal or user equipment of any kind such as a mobile phone or a laptop computer or the like, and a network side, e.g. representing any kind of network entities such as an ANDSF network entity or the like, possibly in operational coupling with a further network entity such as a device management server, i.e. any server (e.g. an enterprise Linux PC) which sends e.g. enterprise settings e.g. to enterprise devices.

According to the embodiment of FIG. 3, a device-initiated method ("pull mode") is illustrated, which is based on device-initiated network discovery (S310). Such an initiation may be the sending of a dedicated network discovery request from the device side to the network side. Namely, via a scanning process, the device discovers neighboring networks of same or multiple network technologies (like WiMAX, WLAN, etc.). As those networks are still unfamiliar to the device and as the device and the network both implement network discovery functionality, the device requests (S320) more information for these discovered networks from the network, e.g. the used operator network (see example scenario below). In the request, the device may also indicate to the network that specific communication settings are needed for all or some of the discovered networks. That is, communication settings provision may be for all affected networks/services or only for those indicated by the device (e.g. when it already has some of the settings, but not all). For example, the device may request neighbor network information and indicate at the same time that access network settings and any other credentials for using the network are needed. As another example, only those communication settings may be provided to the device, which have been changed in the meantime, i.e. as compared with those communication settings currently being in effect at the device. This could be accomplished in that the device indicates in the request the settings presently set at the device, and the network side checks whether these settings are still valid and only provides those new settings which have been changed in the meantime.

The network, i.e. the network entity, which receives the request provides in process S330 normal network discovery information to the device (e.g. network operator, roaming partners, preferences and policies for selecting a network being at least one of preferred, trusted and suitable for a desired service), like information as to if using a given access network (e.g. 3GPP cellular access according to FIG. 7) is preferred or not. In addition, the network, i.e. the network entity in question, causes settings provision to the device (S340) either automatically or based on the indication in the request message of S320 that the device needs settings for one or more networks mentioned within the request message.

The actual settings provision being caused in process S340 may be implemented as part of network discovery functionality or by any other suitable functionality, e.g. device management (DM) functionality.

Accordingly, it may be implemented in the same network entity involved so far (e.g. an ANDSF entity) or in a separate network entity (e.g. a device management server). For details, reference is made to FIGS. 4, 8 and 9 below. Notwithstanding the implementation of the settings provision procedure, the requested settings retrieved thereby are provided to the requesting device (S350). In case that network discovery functionality implements settings provision, settings (potentially acquired from a local settings database) may be included into and provided by one or more network discovery response messages sent to the device. In case that another functionality (e.g. device management) implements settings provision, respective separate (e.g. device management) operations may be triggered before/after/during network discovery signaling procedures, and the device is supplied with a configuration of the requested settings. Another alternative is that a network discovery (and selection) functionality element and another element (like a device management server) communicate and exchange relevant information which e.g. a network discovery element provides to the device (not requiring a separate communication from different network entities).

Figure 4:
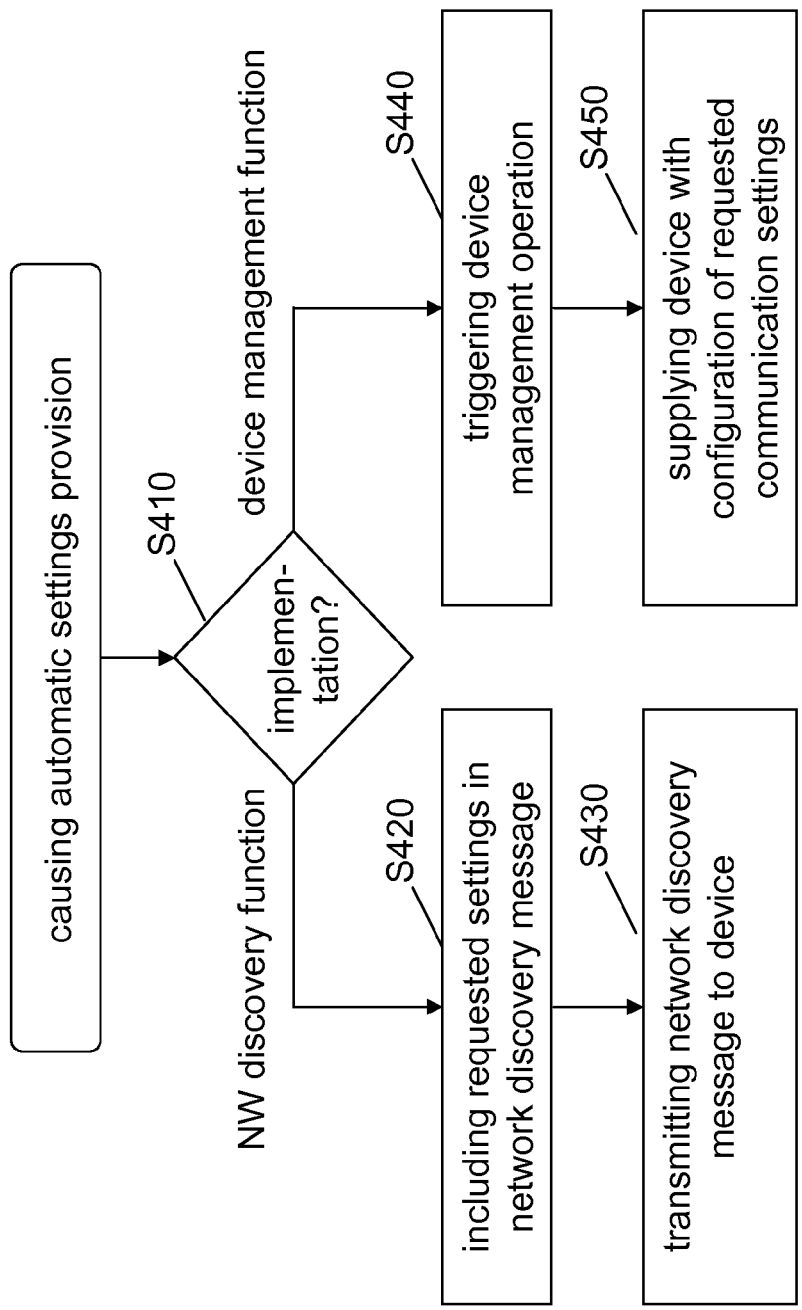
FIG. 4 shows a flow diagram of a method of causing automatic settings provision in the method of FIG. 3 according to an exemplary embodiment of the present invention.

This is illustrated by FIG. 4 which shows a flow diagram of a method of causing automatic (communication) settings provision in the method of FIG. 3 according to an exemplary embodiment of the present invention.

As regards a device management-based settings provision (cf. processes S440 and S450), it is to be noted that a device management (DM) operation is not triggered by device management (e.g. a DM server) itself, but some other element, such as ANDSF, user portal or an administrator. In order to execute any settings provision, DM (or an equivalent element) needs to know device-specific information (namely, e.g. information how to reach the device, which settings are needed). This information must come from outside the actual device management, e.g. from some other network element or from a DM portal. In addition, triggering of a device management operation will also originate from outside the actual device management, e.g. from a network discovery functionality. That is, although the actual device management (e.g. a DM server) may be the originator of the provision signaling from the device's point of view, the actual trigger of the process comes from somewhere else, e.g. some other network element or device such as an ANDSF.

Upon obtaining of the requested settings at the device, either by receiving the requested settings in a network discovery message or by receiving a configuration based on another functionality such as device management, the device is automatically configured accordingly. Then, network selection and/or network access and/or service access (if service settings provided as well) may be performed on the basis of the discovered networks and the obtained communication settings, respectively.

The following is an example scenario for a device-initiated settings provision as described in connection with FIGS. 3 and 4 above.

An operator has a High Speed Packet Access (HSPA) (=cellular) network of the $2^{nd}$ or $3^{rd}$ generation, as well as WLAN hot spots. A device is using the cellular network and detects a WLAN hot spot (as a neighboring network access point). As the WLAN hot spot has not been used before by the device, the device requests information about the hot spot e.g. from an ANDSF server of the operator network, which is located behind the cellular and WLAN networks (or optionally in a SAE (System Architecture Evolution) core network in case of LTE (Long-Term Evolution)). The device and the ANDSF server communicate e.g. using IP messages, thus making communication transparent from the access network point of view, because of being user data. The device learns from the network that the detected WLAN hot spot is ok (i.e. trustworthy, suitable or the like) to be used. As the device does not have any settings for the WLAN network, the device automatically triggers a settings request towards the network's ANDSF server or a device management server (as examples), and receives settings allowing accessing the detected WLAN hot spot. Also a subscriber home operator network "HPLMN" (Home Public Land Mobile Network) might be contacted, or a service provider's "network discovery and selection" function located outside any operator network, when IP is used for communication (for example virtual network operator, enterprise or the like).

Figure 5:
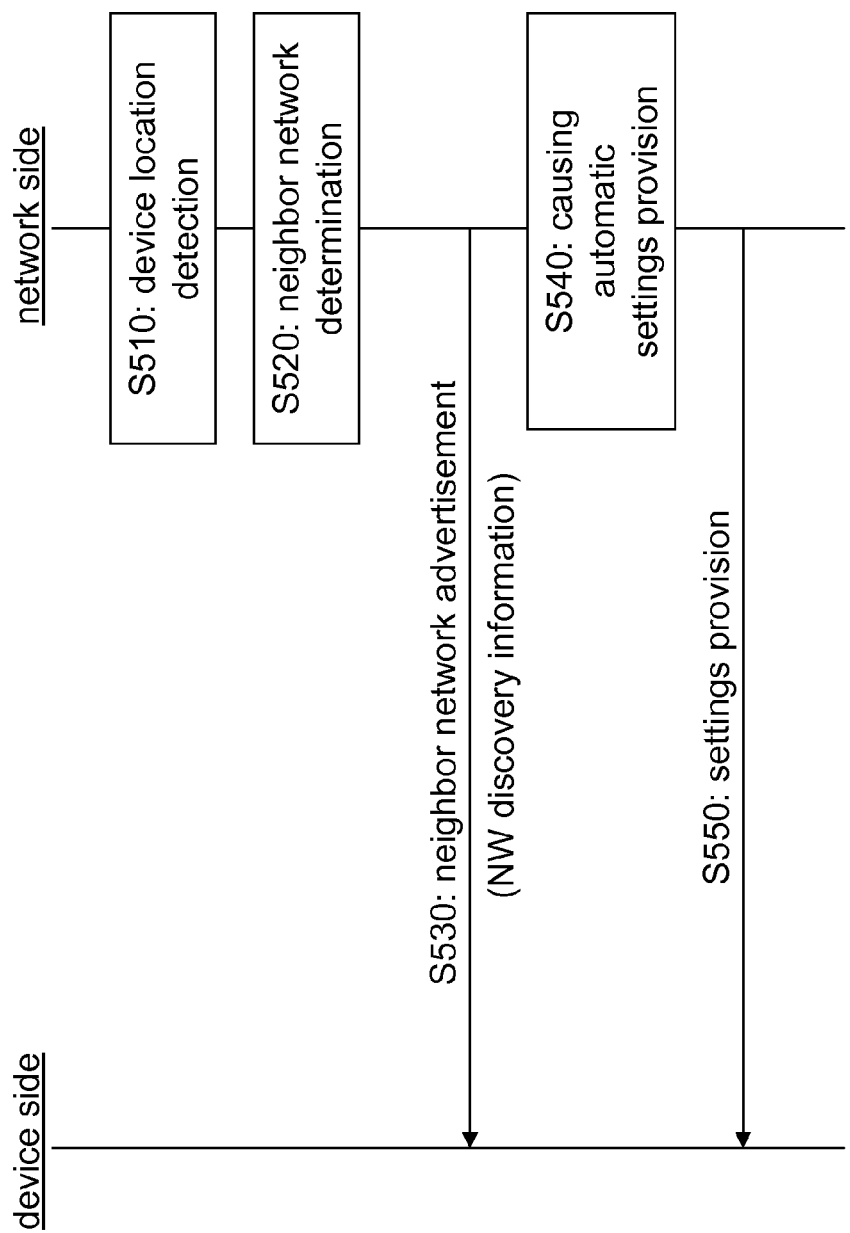
FIG. 5 shows a signaling diagram of a method according to an exemplary embodiment of the present invention.

FIG. 5 shows a signaling diagram of a method according to an exemplary embodiment of the present invention. Similar to FIG. 3, the depicted signaling is between a device side, e.g. representing a terminal or user equipment of any kind such as a mobile phone or a laptop computer or the like, and a network side, e.g. representing any kind of network entities such as an ANDSF network entity or the like, possibly in operational coupling with a further network entity such as a device management server.

According to the embodiment of FIG. 5, a network-initiated method ("push mode") is illustrated, which is based on network-initiated network discovery. Such a network-sided initiation may be based on device location detection (S510), neighbor network determination (S520), and/or (which is not illustrated) detection of a new device in the system and changed communication settings (like a periodically changing password for accessing operator WLAN public hot spot) being pushed and updated to legitimate devices, the details thereof being not relevant for the present embodiments. Namely, in one example the network is able to know (at least a rough) location of a device or the presence/visibility of a certain cell by monitoring traffic in the network (or by use of standard methods to locate the device, e.g. the device reports its position, location measurements or the network calculates the position based on some network-based methods). As the network knows neighboring networks to the device (a feature that is able to link networks and cells/access points to a certain location or cell/access point being visible for the device), the network is able to send a "neighbor network advertisement" to the device, in which the network may provide information of one or more neighboring networks of same or multiple network technologies to the device, i.e. network discovery information (S530). This information allows the device to learn about other potential access networks in proximity to be used for accessing certain services. That is, also in this case, communication settings provision may be for all affected networks/services or only for some of these. If so, only those communication settings may be provided, which have changed as compared with communication settings currently being in effect at the device.

Also the following scenarios are covered by respective embodiment of the present invention. On the one hand, a network may be aware of a device location (e.g. via GPS, used cell Id in cellular, used WLAN access point, etc.). When entering a certain location/area, the network triggers communication settings provision to the device automatically, e.g. via cellular cell. This may not even use a separate network discovery and selection procedure (provided e.g. by IEEE 802.21, 3GPP ANDSF, etc.). On the other hand, another example relates to operator public WLAN hot spots, wherein in case of changing settings related to public hot spots, like authentication credentials (password), new settings are provided automatically to legitimate users/devices.

In addition, the network, i.e. the network entity in question, automatically causes settings provision to the device. The actual settings provision being caused in process S540 may be implemented as part of network advertisement functionality (network discovery functionality) or by any other suitable functionality, e.g. device management (DM) functionality. Accordingly, it may be implemented in the same network entity involved so far (e.g. an ANDSF entity) or in a separate network entity (e.g. a device management server). For details, reference is made to FIGS. 6, 10 and 11 below. Notwithstanding the implementation of the settings provision procedure, the requested settings retrieved thereby are provided to the requesting device (S550). This may be effected before/after/during neighbor network advertisement signaling procedures. In case that neighbor network advertisement functionality implements settings provision, settings (potentially acquired from a local settings database) may be included into and provided by one or more neighbor network advertisement messages sent to the device. In case that another functionality (e.g. device management) implements settings provision, respective separate (e.g. device management) operations are triggered before/after/during network discovery signaling procedures, and the device is supplied with a configuration of the requested settings.

Figure 6:
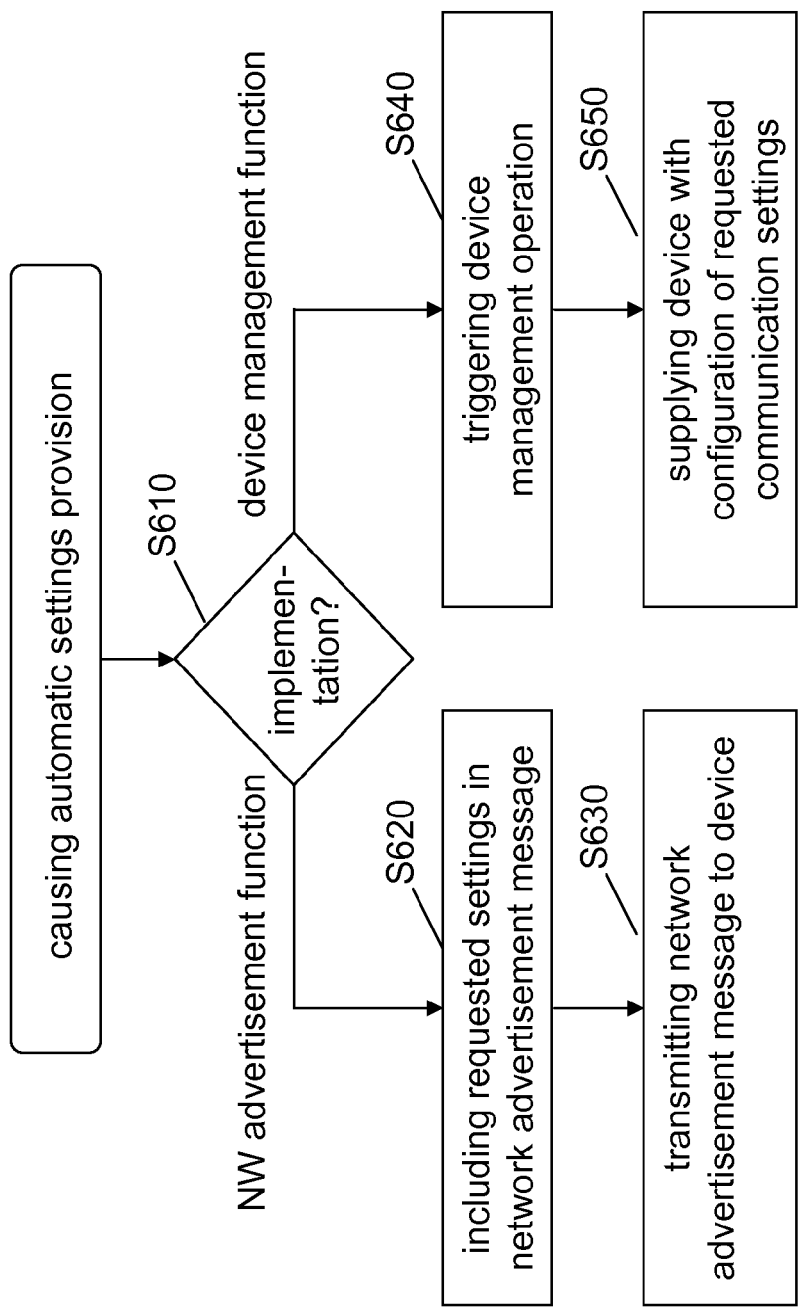
FIG. 6 shows a flow diagram of a method of causing automatic settings provision in the method of FIG. 5 according to an exemplary embodiment of the present invention.

This is illustrated by FIG. 6 which shows a flow diagram of a method of causing automatic (communication) settings provision in the method of FIG. 5 according to an exemplary embodiment of the present invention.

As an additional use case for the above-described "push mode", there may be a case that the network side provides communication settings to the device when these have changed. For example, when an operator periodically changes WLAN credentials (for security purposes) and then provides these new changed credentials to own and/or roaming devices by way of network-initiated procedures.

With respect to the embodiments described above in connection with FIGS. 3 to 6, when device management as an example for some separate functionality other than network discovery implements (access network) settings provision to a device, neighbor network advertisement functionality or network discovery functionality triggers device management operations.

In this regard, device management (e.g. a device management server) is told for example device address information requiring settings and to which networks settings are required in order to limit exchanged information. The network (e.g. a device management server) may also tell the device the contact information where the device may obtain (access network) settings, if needed, for example an IP address. This allows the device to trigger e.g. device management operations, when needed, or contact e.g. enterprise "settings server". For example, the following signaling flow may be performed:

| | Terminal | Registry | Provision (e.g. DM) |
|---|---|---|---|
| Discover | | Request | |
| | | Rsp | |
| DM session | | | OMA DM Package 1 |

Generally, when reference to device management is made herein, any device management protocol allowing a remote management of (mobile) devices may be applied, such as for example the platform-independent OMA (Open Mobile Alliance) device management protocol. When reference is made to a device management operation herein, a respective operation according to the applied device management protocol is meant, e.g. a request-response communication protocol.

Actually, a device management (DM) operation means data exchange, e.g. IP data exchange. In this regard, it is noticed that device management consists of two phase: initial settings provision (called bootstrap using client provision) and an actual management phase. For bootstrapping (to deliver proper settings to a device for DM operation) information exchange happens for example over WAP (Wireless Application Protocol), e.g. WAP Push, or SMS (Short Message Service). However, an actual DM operation means (IP) data exchange and does not have such link to a transport mechanism e.g. WAP or SMS. Further, it is noticed that device management in the context of the present specification applies for both SIM devices, e.g. cellular phones, and SIMless devices, e.g. laptop computers (SIM=Subscriber Identity Module).

Figure 7:
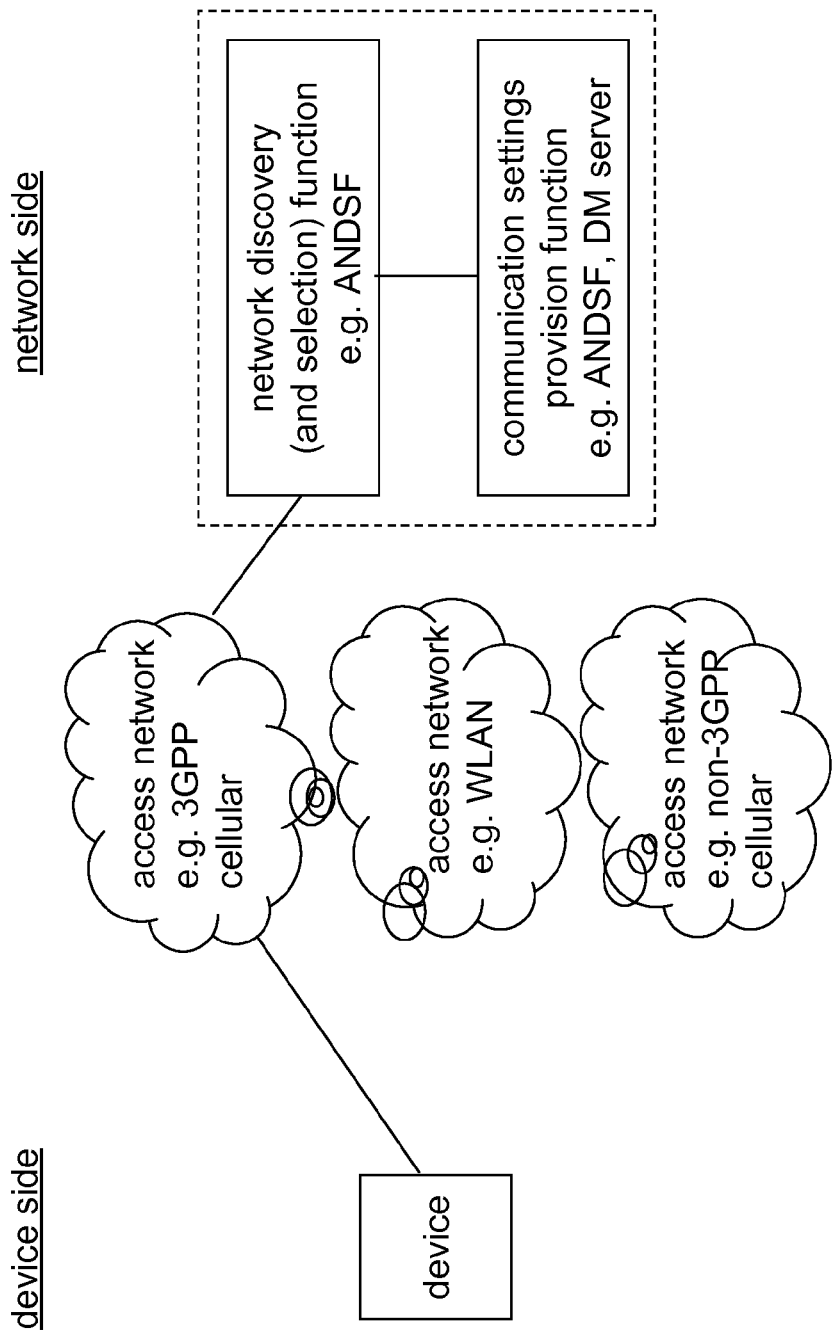
FIG. 7 shows a schematic illustration of a network environment in which embodiments of the present invention may be applied.

FIG. 7 shows a schematic illustration of a network environment in which embodiments of the present invention may be applied.

As illustrated in FIG. 7, any kind of device may represent a device side of a corresponding system, any kind of network entity/entities may represent a network side of the corresponding system. On the network side, there is a network discovery (and selection) function, which may e.g. by implemented in an ANDSF entity, and a communication settings provision function, which may e.g. be implemented in the same or another ANDSF entity or a separate entity (e.g. a device management server) operationally coupled with the entity implementing the network discovery (and selection) function. In-between the device side and the network side of the corresponding system, there is located any kind of a plurality of (access) networks. In the non-limiting example illustrated in FIG. 7, a 3GPP cellular access network and a WLAN access network and a non-3GPP access network are exemplarily shown.

In addition or alternatively, it is to be noted that there is also covered a network scenario where communication settings are provided, which may be not related to an access network (as exemplarily illustrated), but e.g. to an operator network. Thereby, service settings and other communication parameters may be provided, which are not directly related to access networks. For example, a roaming device/user enters an operator network, and the operator provides local VoIP (e.g. gaming, entertainment, etc.) settings to an authorized roaming device/subscriber, thus allowing an efficient use of local services of the operator network. For example after discovering and selecting a roaming network to be used, the network operator provides local settings to roaming devices.

Although embodiments of the present invention have been described mainly with reference to methods, procedures and functions above, corresponding embodiments of the present invention also cover respective apparatuses, network nodes, including both software and hardware thereof.

For the following block diagrams of FIGS. 8 to 11, the following is to be noted. The individual blocks are meant to illustrate respective functional blocks implementing a respective function, process or procedure, respectively. Such functional blocks are implementation-independent, i.e. may be implemented by means of any kind of hardware or software, respectively. The lines interconnecting individual blocks are meant to illustrate an operational coupling therebetween, which on the one hand is implementation-independent (e.g. wired or wireless) and on the other hand may also comprise an arbitrary number of intermediary functional entities not shown. Dotted lines within functional blocks are meant to illustrate a passing of signals through this block, which are carried on respective block interconnections. The arrangements of functional entities arranged within dashed blocks are independent of each other, and may be implemented in the same or separate apparatuses or network nodes. In particular, even though shown in connection with each other, a device and a network entity are independent instances and constitute separate (but combinable) embodiments of the present invention. For the sake of simplicity, networks located in-between individual apparatuses (c. FIG. 7) are omitted.

In FIGS. 8 to 11, only those functional blocks are illustrated, which relate to any one of the above-described methods, procedures and functions. A skilled person is deemed to acknowledge the presence of any other conventional functional blocks required for an operation of respective structural arrangements, such as e.g. a power supply, a central processing unit or the like.

Figure 8:
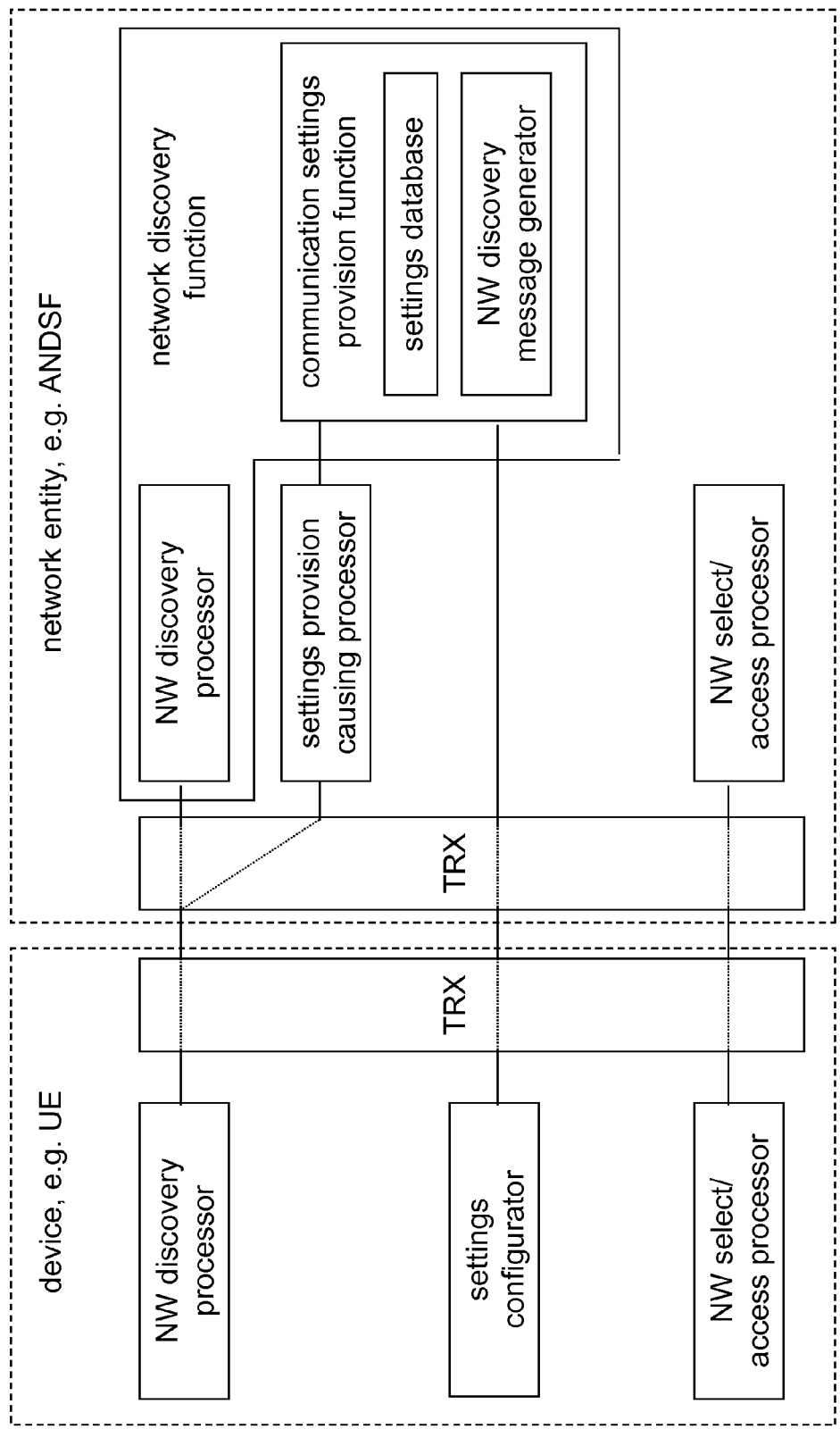
FIG. 8 shows a block diagram of an exemplary arrangement of a device and a network entity according to an embodiment of the present invention.

FIG. 8 shows a block diagram of an exemplary arrangement of a device and a network entity according to an embodiment of the present invention.

According to the embodiment of FIG. 8, a network-sided apparatus is exemplarily represented by an ANDSF network entity. It comprises a network discovery functional entity, i.e. means for discovering networks being available for a device, and a communication settings provision functional entity, i.e. means for providing communication settings for at least one of discovered networks to the device.

Further, the apparatus according to the present embodiment comprises a receiver (TRX), i.e. means for receiving a request for communication settings for at least one of discovered networks from the device, and a settings provision causing processor, i.e. means for causing communication settings provision for the requested communication settings (in accordance with process S340 of FIG. 3). The settings provision processor is for triggering the communication settings provision function, which is configured as a part of the network discovery function, to perform communication settings provision (in accordance with processes S420, S430 of FIG. 4). To this end, the communication settings provision function comprises a settings database, i.e. means for holding communication settings of neighboring networks, a network discovery message generator, i.e. means for including the requested communication settings from the settings database in a network discovery message, and (possibly) a transmitter, i.e. means for transmitting the network discovery message including the requested communication settings to the device. It is to be noted that FIG. 8 depicts an embodiment where the transmitter (TRX) is implemented outside the communication settings provision function. For the implementation, it is irrelevant whether or not the transmitter is regarded to be assigned to the communication settings provision function.

According to the embodiment of FIG. 8, a device-sided apparatus is exemplarily represented by a device, e.g. a user equipment UE. It comprises a network discovery processor (a counterpart of the network discovery function of the apparatus), i.e. means for discovering networks being available for access, and a settings configurator (a counterpart of the communication settings provision function of the apparatus), i.e. means for obtaining communication settings for at least one of discovered networks from a network. The network discovery processor of the device apparatus is configured to initiate network discovery towards the network. The device apparatus further comprises a transmitter (TRX), i.e. means for sending a request for communication settings for at least one of discovered networks to the network (network entity apparatus), and the settings configurator is configured to receive the requested communication settings (by way of network discovery messages) and to configure the apparatus in accordance with the received communication settings for accessing at least one of the discovered networks.

Moreover, any one or both of the device apparatus and the network entity apparatus according to the present embodiment (optionally) may comprise a network select/access processor, i.e. means for selecting a network on the basis of the discovered networks and/or for accessing the selected network on the basis of the provided communication settings. Especially for the network side, such a means may be optional, since the network side might just provide information and settings allowing use of surrounding networks.

Figure 9:
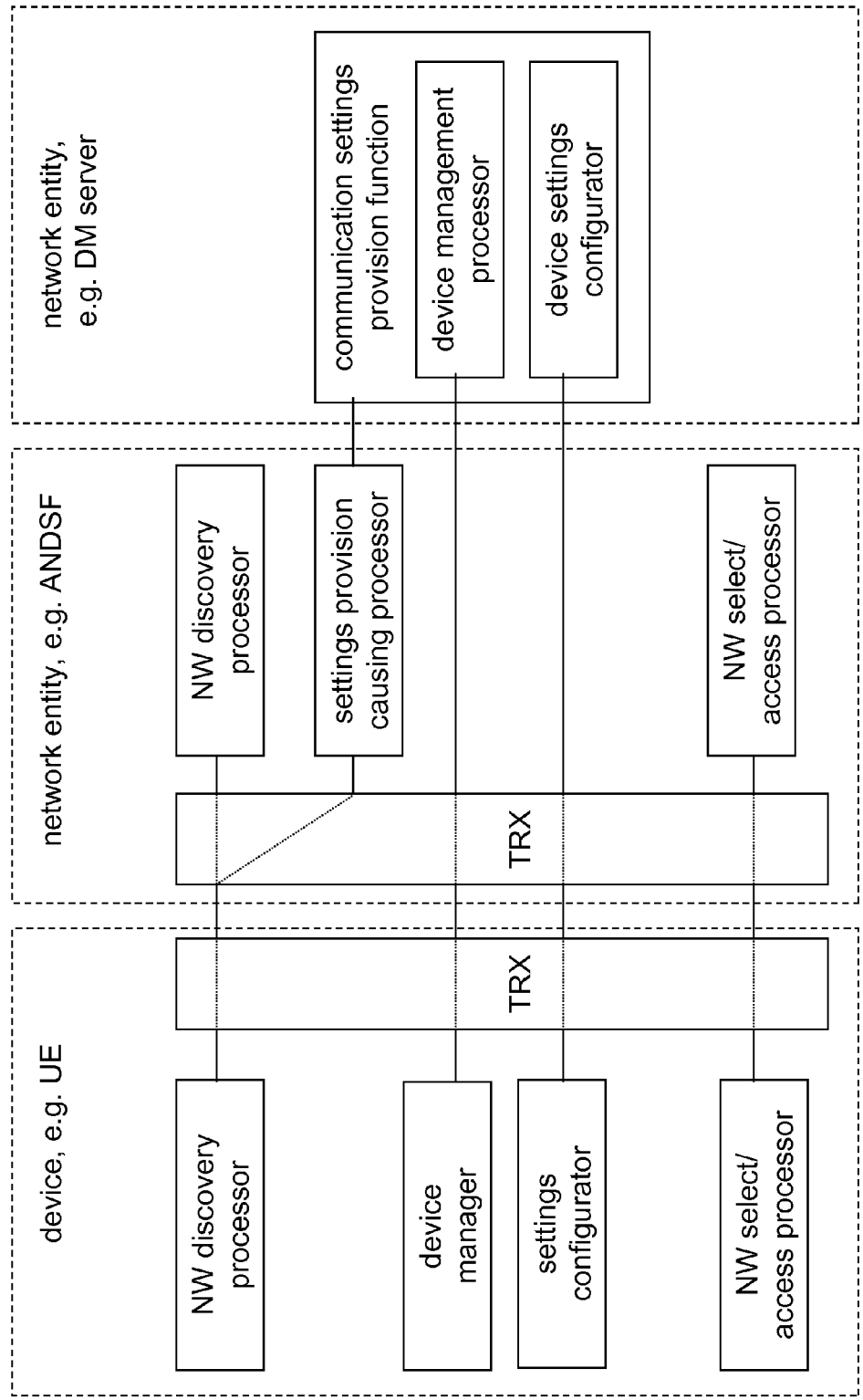
FIG. 9 shows a block diagram of an exemplary arrangement of a device and two network entities according to an embodiment of the present invention.

FIG. 9 shows a block diagram of an exemplary arrangement of a device and two network entities (capable of being implemented as a single apparatus) according to an embodiment of the present invention.

According to the embodiment of FIG. 9, a network-sided apparatus is exemplarily represented by an ANDSF network entity and a DM server network entity. These two entities may be implemented as a single apparatus or as separate apparatuses according to an embodiment of the present invention.

The ANDSF network entity apparatus comprises a network discovery functional entity in the form of a network discovery processor, i.e. means for discovering networks being available for a device. The DM server network entity apparatus comprises a communication settings provision functional entity, i.e. means for providing communication settings for at least one of discovered networks to the device (either directly or via another entity). As exemplarily illustrated, the DM server network entity apparatus may provide communication settings to an ANDSF server that transfers the settings to the device (as part of another ANDSF communication).

Further, the ANDSF network entity apparatus according to the present embodiment comprises a receiver (TRX), i.e. means for receiving a request for communication settings for at least one of discovered networks from the device, and a settings provision causing processor, i.e. means for causing communication settings provision for the requested communication settings (in accordance with process S340 of FIG. 3). The settings provision processor is for triggering the communication settings provision function, which is configured as a part of a device management function of the DM server network entity apparatus, to perform communication settings provision (in accordance with processes S440, S450 of FIG. 4). To this end, the communication settings provision function comprises a device management processor, i.e. means for performing device management operation, and a device settings configurator, i.e. means for supplying (via a transceiver) a configuration of the requested communication settings on the basis of the triggered device management operation to the device. For the implementation, it is irrelevant whether or not the transceiver is regarded to be assigned to the communication settings provision function.

According to the embodiment of FIG. 9, a device-sided apparatus is exemplarily represented by a device, e.g. a user equipment UE. It comprises a network discovery processor (a counterpart of the network discovery function/processor of the ANDSF network entity apparatus), i.e. means for discovering networks being available for access, and a settings configurator (a counterpart of the communication settings provision function and the device settings configurator of the DM server network entity apparatus, respectively), i.e. means for obtaining communication settings for at least one of discovered networks from a network. The network discovery processor of the device apparatus is configured to initiate network discovery towards the network. The device apparatus further comprises a transmitter (TRX), i.e. means for sending a request for communication settings for at least one of discovered networks to the network (network entity apparatus). The device apparatus further comprises a device manager (counterpart of the device management processor of the DM server network entity apparatus), i.e. means for receiving a configuration of the requested communication settings, and the settings configurator is further configured to configure the apparatus in accordance with the received configuration for accessing at least one of the discovered networks.

Moreover, any one or both of the device apparatus and the network entity apparatus according to the present embodiment (optionally) may comprise a network select/access processor, i.e. means for selecting a network on the basis of the discovered networks and/or for accessing the selected network on the basis of the provided communication settings. Especially for the network side, such a means may be optional, since the network side might just provide information and settings allowing use of surrounding networks.

Figure 10:
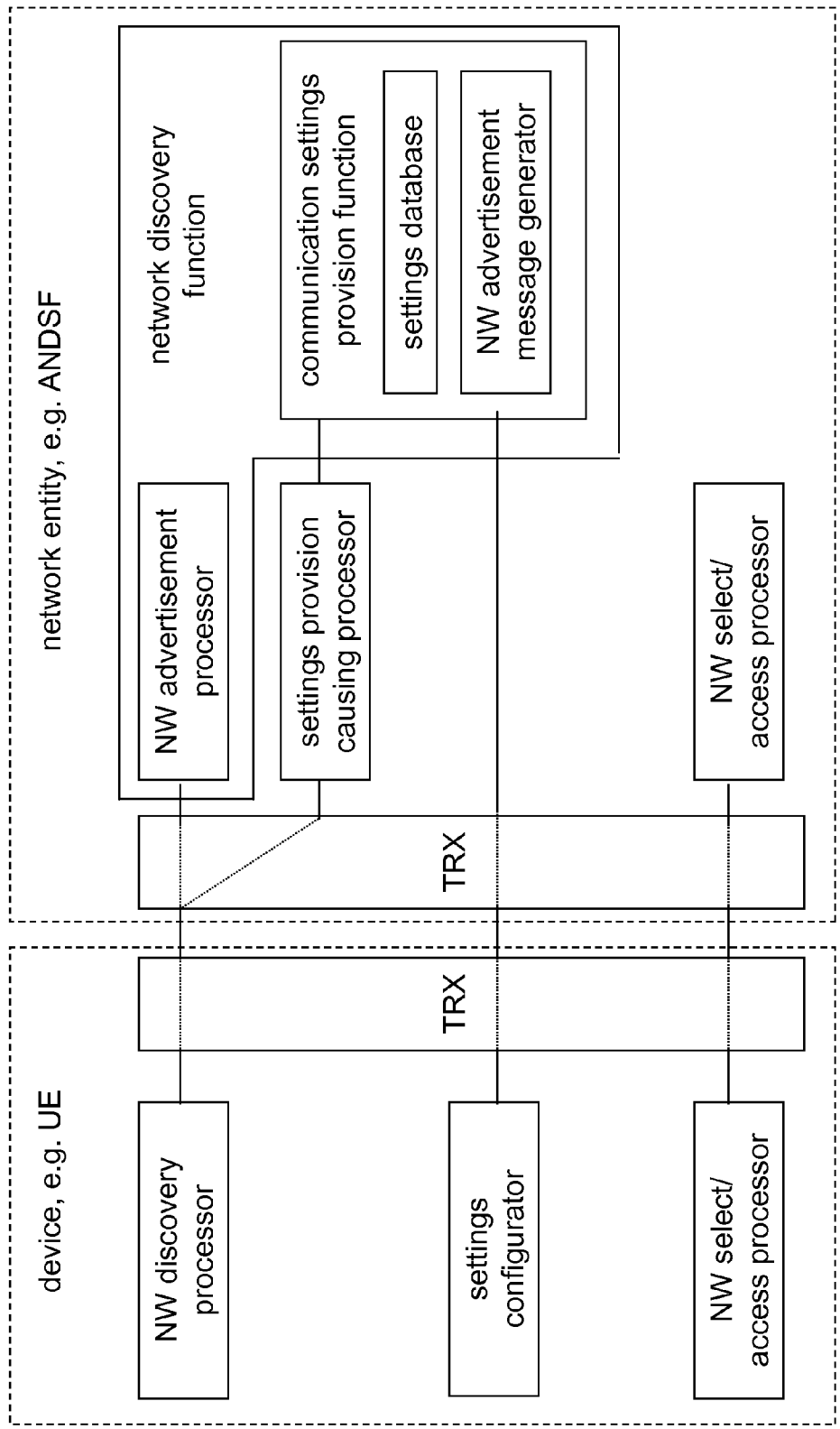
FIG. 10 shows a block diagram of an exemplary arrangement of a device and a network entity according to another embodiment of the present invention.

FIG. 10 shows a block diagram of an exemplary arrangement of a device and a network entity according to another embodiment of the present invention.

According to the embodiment of FIG. 10, a network-sided apparatus is exemplarily represented by an ANDSF network entity. It comprises a network discovery functional entity, i.e. means for discovering networks being available for a device, and a communication settings provision functional entity, i.e. means for providing communication settings for at least one of discovered networks to the device. The apparatus according to FIG. 10 is similar to the apparatus according to FIG. 8, except that it comprises a network discovery function comprising (instead of the network discovery processor of FIG. 8) a network advertisement processor, i.e. means for advertising neighboring networks to the device (in accordance with processes S510, S520, S530 of FIG. 5) and a respective transmitter (TRX). Thus, it is suitable for initiating network discovery at the network side.

Hence, the apparatus according to the present embodiment comprises a transmitter (TRX), i.e. means for transmitting neighbor network advertisement messages to the device.

The settings provision causing processor, i.e. means for causing communication settings provision for the requested communication settings, is configured to operate in accordance with process S540 of FIG. 5). The settings provision causing processor is for triggering the communication settings provision function, which is configured as a part of the network discovery function, to perform communication settings provision (in accordance with processes S620, S630 of FIG. 6).

The device according to FIG. 10 is similar to that of FIG. 8, except that it comprises a receiver (TRX), i.e. means for receiving a neighbor network advertisement from the network. As in the embodiment of FIG. 8, the settings configurator is configured to receive the requested communication settings (in this case by way of neighbor network advertisement messages) and to configure the apparatus in accordance with the received communication settings for accessing at least one of the discovered networks.

Figure 11:
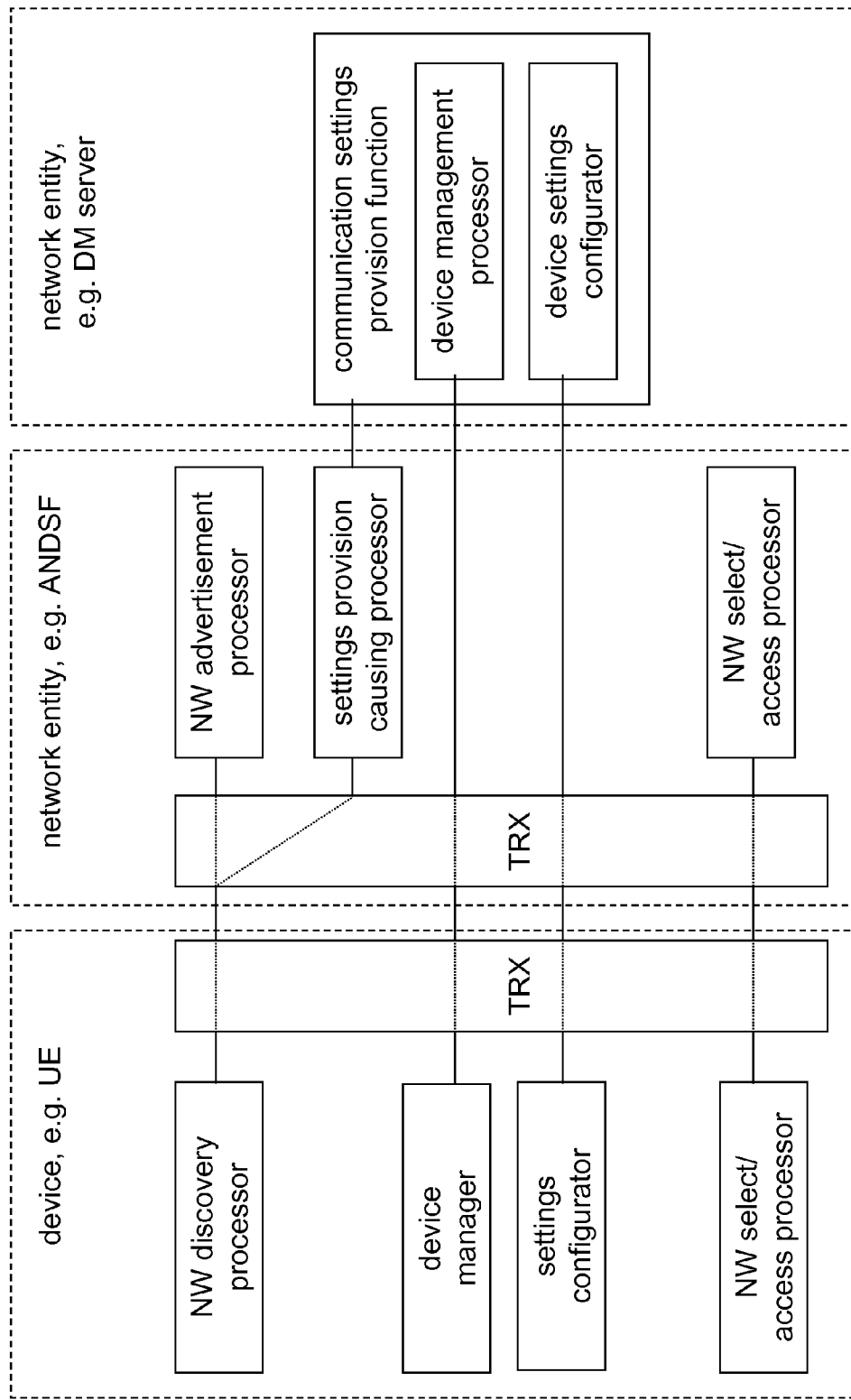
FIG. 11 shows a block diagram of an exemplary arrangement of a device and two network entities according to another embodiment of the present invention.

FIG. 11 shows a block diagram of an exemplary arrangement of a device and two network entities (capable of being implemented as a single apparatus) according to another embodiment of the present invention.

According to the embodiment of FIG. 11, a network-sided apparatus is exemplarily represented by an ANDSF network entity and a DM server network entity. These two entities may be implemented as a single apparatus or as separate apparatuses according to an embodiment of the present invention.

The ANDSF network entity apparatus according to FIG. 11 is similar to that according to FIG. 9, except that it comprises a network discovery function comprising (instead of the network discovery processor of FIG. 9) a network advertisement processor, i.e. means for advertising neighboring networks to the device (in accordance with processes S510, S520, S530 of FIG. 5) and a respective transmitter (TRX). Thus, it is suitable for initiating network discovery at the network side.

Hence, the ANDSF network entity apparatus according to the present embodiment comprises a transmitter (TRX), i.e. means for transmitting neighbor network advertisement messages to the device.

According to the present embodiment, the settings provision causing processor of the ANDSF network entity apparatus, i.e. means for causing communication settings provision for the requested communication settings, is configured to operate in accordance with process S540 of FIG. 5). The settings provision causing processor is for triggering the communication settings provision function of the DM server network entity apparatus, which is configured as a part of a device management function of the DM server network entity apparatus, to perform communication settings provision (in accordance with processes S640, S650 of FIG. 6).

The device according to FIG. 11 is similar to that of FIG. 9, except that it comprises a receiver, i.e. means for receiving a neighbor network advertisement from the network. As in the embodiment of FIG. 9, the device manager is configured to receive a configuration of the requested communication settings, and the settings configurator is configured to configure the apparatus in accordance with the received configuration for accessing at least one of the discovered networks.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Furthermore, method steps and functions likely to be implemented as software code portions and being run using a processor at one of the entities are software code independent and can be specified using any known or future developed programming language such as e.g. Java, C++, C, and Assembler. Method steps and/or devices or means likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. In the context of embodiments as described above, a user equipment may e.g. by used as a modem to configure WLAN (and/or WiMAX) network preferences for a laptop PC having integrated WLAN (and WiMAX) radios. Such and similar principles are to be considered as known to those skilled in the art.

Software in the sense of the present description comprises software code as such comprising code means for performing the respective functions, as well as software (or a computer program or a computer program product) embodied on a tangible medium such as a computer-readable storage medium having stored thereon a respective data structure or code portions or embodied in a signal or in a chip, potentially during processing thereof.

Generally, for the purpose of the present invention as described herein above, it should be noted that an access technology may be any technology by means of which a user equipment can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed lines but also circuits switched access technologies; access technologies may be distinguishable in at least two categories or access domains such as packet switched and circuit switched, but the existence of more than two access domains does not impede the invention being applied thereto, an access network may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user may experience services from an access network such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

There is e.g. provided network discovery comprises discovering networks being available for a device and automatically providing communication settings for at least one of discovered networks to the device. The network discovery may be device-initiated or network-initiated. The communication settings provision may be effected by network discovery functionality or another functionality such as device management functionality. The thus provided communication settings may be related to an access network or to an operator network.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

We claim:

1. A method comprising:
   sending a network discovery request to a network element, wherein the network discovery request is initiated by a mobile device;
   receiving a network discovery message by the mobile device, the network discovery message comprising information on discovered networks from said network element;
   sending a request for communication settings for at least one of discovered networks to said network element, wherein said request for the communication settings is comprised in said network discovery request;
   receiving, by the mobile device, the communication settings for at least one of the discovered networks from said network element;
   selecting a wireless local area network (WLAN) hot spot as a network access point on the basis of the discovered networks;
   configuring, by the mobile device, in accordance with the received communication settings for accessing the wireless local area network (WLAN) hot spot on the basis of the received communication settings; and
   accessing the wireless local area network (WLAN) hot spot on the basis of the received communication settings,
   wherein the communications settings comprise wireless local area network (WLAN) security settings that include Wi-Fi Protected Access (WPA) or Wired Equivalent Privacy (WEP) keys.

2. The method according to claim 1, wherein said received communication settings are comprised in said received network discovery message.

3. The method according to claim 1, wherein said received communication settings comprise at least one of account information, security settings, authentication credentials, communication credentials, and network access information.

4. The method according to claim 1, wherein the communication settings comprise a WLAN service set identifier.

5. A method comprising:
   receiving, by an access network discovery and selection function (ANDSF) network entity, a network discovery request initiated by a mobile device;
   sending, by the ANDSF network entity, a network discovery message comprising information on discovered networks to said mobile device;
   receiving a request for communication settings for at least one of discovered networks from the mobile device, wherein said request for the communication settings is comprised in said network discovery request;
   obtaining, by the ANDSF network entity, communication settings for at least one of the discovered networks; and
   providing, by the ANDSF network entity, said communication settings for said at least one of the discovered networks to said mobile device,
   wherein the communications settings comprise wireless local area network (WLAN) security settings that include Wi-Fi Protected Access (WPA) or Wired Equivalent Privacy (WEP) keys.

6. The method according to claim 5, wherein said provided communication settings are provided in said received network discovery message.

7. The method according to claim 5, wherein said provided communication settings comprise at least one of account information, security settings, authentication credentials, communication credentials, and network access information.

8. An apparatus comprising:
   a transmitter configured to send a network discovery request to a network element, wherein the network discovery request is initiated by a mobile device;
   a receiver configured to receive a network discovery message comprising information on discovered networks from said network element;
   the transmitter configured to send a request for communication settings for at least one of discovered networks to said network element, wherein said request for the communication settings is comprised in said network discovery request;
   the receiver configured to receive the communication settings for at least one of the discovered networks from said network element; and
   a processor configured to
   select a wireless local area network (WLAN) hot spot as a network access point on the basis of the discovered networks;
   configure in accordance with the received communication settings for accessing the wireless local area network (WLAN) hot spot on the basis of the received communication settings; and
   access the wireless local area network (WLAN) hot spot on the basis of the received communication settings,
   wherein the communications settings comprise wireless local area network (WLAN) security settings that include Wi-Fi Protected Access (WPA) or Wired Equivalent Privacy (WEP) keys.

9. The apparatus according to claim 8, wherein said received communication settings are comprised in said received network discovery message.

10. The apparatus according to claim 8, wherein said received communication settings comprise at least one of account information, security settings, authentication credentials, communication credentials, and network access information.

11. The apparatus according to claim 8, wherein the communication settings comprise a WLAN service set identifier.

12. An apparatus comprising:
an access network discovery and selection function (ANDSF) network entity, the ANDSF network entity comprising
a receiver configured to receive a network discovery request from a mobile device;
a transmitter configured to send a network discovery message comprising information on discovered networks to said mobile device;
the receiver configured to receive a request for communication settings for at least one of discovered networks from the mobile device, wherein said request for the communication settings is comprised in said network discovery request;
a processor configured to obtain said communication settings for at least one of the discovered networks and to provide said communication settings for said at least one of the discovered networks to said mobile device,
wherein the communications settings comprise wireless local area network (WLAN) security settings that include Wi-Fi Protected Access (WPA) or Wired Equivalent Privacy (WEP) keys.

13. The apparatus according to claim 12, wherein said provided communication settings are provided in said received network discovery message.

14. The apparatus according to claim 12, wherein said provided communication settings comprise at least one of account information, security settings, authentication credentials, communication credentials, and network access information.

15. A non-transitory computer-readable medium comprising program code means being arranged, when run on a processor of an apparatus, to perform a method comprising:
sending a network discovery request to a network element, wherein the network discovery request is initiated by a mobile device;
receiving a network discovery message by the mobile device, the network discovery message comprising information on discovered networks from said network element;
sending a request for communication settings for at least one of discovered networks to said network element, wherein said request for the communication settings is comprised in said network discovery request;
receiving the communication settings for at least one of the discovered networks from said network element;
selecting a wireless local area network (WLAN) hot spot as a network access point on the basis of the discovered networks;
configuring in accordance with the received communication settings for accessing the wireless local area network (WLAN) hot spot on the basis of the received communication settings; and
accessing the wireless local area network (WLAN) hot spot on the basis of the received communication settings,
wherein the communications settings comprise wireless local area network (WLAN) security settings that include Wi-Fi Protected Access (WPA) or Wired Equivalent Privacy (WEP) keys.

16. A non-transitory computer-readable medium comprising program code means being arranged, when run on a processor of an apparatus, to perform a method comprising:
receiving, by an access network discovery and selection function (ANDSF) network entity, a network discovery request from a mobile device;
sending, by the ANDSF network entity, a network discovery message comprising information on discovered networks to said mobile device;
receiving a request for communication settings for at least one of discovered networks from the mobile device, wherein said request for the communication settings is comprised in said network discovery request;
obtaining, by the ANDSF network entity, communication settings for at least one of the discovered networks; and
providing, by the ANDSF network entity, said communication settings for said at least one of the discovered networks to said mobile device,
wherein the communications settings comprise wireless local area network (WLAN) security settings that include Wi-Fi Protected Access (WPA) or Wired Equivalent Privacy (WEP) keys.

* * * * *